US007255913B2

(12) United States Patent
Marx et al.

(10) Patent No.: US 7,255,913 B2
(45) Date of Patent: Aug. 14, 2007

(54) LAMINATED UNIT

(75) Inventors: Bele Marx, Schreiberweg 43a, A-1190 Wien (AT); Gilles Mussard, 2, rue Joufroy, F-75017 Paris (FR); Kurt Bernhart, Blumengasse 16, A-2700 Wiener Neustadt (AT)

(73) Assignees: Bele Marx, Vienna (AT); Gilles Mussard, Paris (FR); Kurt Bernhart, Wiener Neustadt (AT); Ilford Imaging Switzerland GmbH, Marly (CH)

( * ) Notice: Subject to any disclaimer, the term of this patent is extended or adjusted under 35 U.S.C. 154(b) by 230 days.

(21) Appl. No.: 10/489,699

(22) PCT Filed: Sep. 20, 2002

(86) PCT No.: PCT/AT02/00273

§ 371 (c)(1),
(2), (4) Date: Jul. 28, 2004

(87) PCT Pub. No.: WO03/025671

PCT Pub. Date: Mar. 27, 2003

(65) Prior Publication Data

US 2004/0253554 A1 Dec. 16, 2004

(30) Foreign Application Priority Data

Sep. 21, 2001 (AT) ............................ A 1506/2001

(51) Int. Cl.
*B32B 7/02* (2006.01)

(52) U.S. Cl. ........................ 428/212; 428/214; 428/38; 428/187; 428/437; 359/630

(58) Field of Classification Search .................. 428/13, 428/46, 426, 437, 447, 448, 212, 214, 38, 428/187; 359/630
See application file for complete search history.

(56) References Cited

U.S. PATENT DOCUMENTS

| | | | | |
|---|---|---|---|---|
| 3,912,542 | A * | 10/1975 | Hirano et al. | 156/104 |
| 4,976,799 | A * | 12/1990 | Wood | 156/106 |
| 5,595,794 | A * | 1/1997 | Cesar | 428/13 |
| 6,824,868 | B2 * | 11/2004 | Bell et al. | 428/343 |

FOREIGN PATENT DOCUMENTS

| | | | |
|---|---|---|---|
| NL | 9201452 | * | 3/1994 |
| WO | 01 10273 | A1 | 9/2002 |

* cited by examiner

*Primary Examiner*—B. Shewareged
(74) *Attorney, Agent, or Firm*—Ladas & Parry LLP

(57) ABSTRACT

A laminated panel unit (1) comprising at least one image layer (3) between at least two panels (2), wherein for an area-contact gluing of the image layer (3) with neighboring panels (2), one intermediate adhesive layer (4, 4') is provided on each side thereof, wherein the two intermediate adhesive layers and/or panels following each image layer (3) have a different thermal expansion behavior so that the image layer (3), due to the inhomogeneous laminate, is tensioned in case of temperature changes; as well as a method for producing a laminated panel unit (1), wherein the image layer (3) is connected with area contact on either side thereof with the panels (2) by using intermediate adhesive layers (4, 4'), the intermediate adhesive layers (4, 4') and/or the panels (2) having a different thermal expansion behavior.

15 Claims, 2 Drawing Sheets

LAMINATED UNIT

The invention relates to a laminated panel unit comprising at least one image layer between at least two panels, wherein for an area-contact gluing of the image layer with neighboring panels, one intermediate adhesive layer is provided on each side thereof, as well as to a method for producing the laminated panel unit according to the invention. The image layer may have any optic image desired, including particularly also writings.

From U.S. Pat. No. 5,595,794 A, a laminated glass unit is known in which, for keeping archives of photograph material, the photograph is glued between two glass panes by means of two adhesive polyurethane layers, whereby a five-layer laminate is formed. However, such a laminated glass unit is only suitable for interior archiving, and even this to a limited extent only, since already with relatively slight temperature fluctuations the adhesive polyurethane layers of the laminated glass unit will expand upon heating, whereby the photograph enclosed between the two glass panes will become wavy, resulting in an optically negative, unacceptable change of the photograph material enclosed in the laminated glass unit.

A somewhat different laminated panel unit which comprises a visible (motif) pattern is described in WO 95/00329 A1. A visible pattern is applied to a plastics sheet, e.g. a polyvinyl butyral sheet, by means of an epoxy-resin-based printing ink and is dried on the polyvinyl butyral sheet before the laminated unit is assembled. More precisely, an ink layer is used by silk-screening to produce a pattern, and only one single plastics sheet, i.e. polyvinyl butyral sheet, is used to interconnect two glass panes or plastics panels.

JP 56-45852 A shows a method of producing stained glass, wherein depressions are technically produced in a resin layer in which finally the desired dyes are injected.

It is now an object of the present invention to provide a laminated panel unit of the initially defined kind, which ensures an optically perfect rendering of the image layer enclosed between the panels even in case of temperature fluctuations. Therewith, in particular, also a laminated panel unit is to be created which can be used externally, e.g. as facade glass-work, windows and the like, and which will withstand also the substantial temperature fluctuations occurring outside. Furthermore, it is an object of the invention to provide a method for producing the inventive laminated panel unit.

The inventive laminated panel unit of the initially defined type is characterized in that the two adhesive intermediate layers and/or panels following each image layer have a different thermal expansion behavior so that the image layer, due to the inhomogeneous laminate, is tensioned in case of temperature changes. With the help of the two layers neighboring the image layer (intermediate adhesive layer, panel), whose thermal expansion behavior differs, the image layer is held tensioned between the two panels even if the laminated panel unit is heated. Thus, the image layer enclosed between the two panels can be prevented from becoming wavy, and also the formation of blisters can be avoided, since the different thermal expansions on the two sides of the image layer will result in an inhomogeneous glass laminate in which merely a slight curvature of the entire laminated panel unit will occur which, however, will have a negative effect neither on the optical appearance nor on the adhesive behavior of the image layer.

For an optically attractive appearance of the laminated panel unit, it is suitable if at least one panel is transparent or translucent, respectively.

For a laminated panel unit having a long useful life, it is advantageous if glass panes are provided as the panels.

An inhomogeneous laminate is reliably ensured if the two intermediate adhesive layers and/or panels are made of different materials, so that during a temperature change the enclosed image layer is continuously subjected to a tension, whereby waviness and blister formation, respectively, can be prevented.

In particular, the undesired waviness and blister formation, respectively, may reliably be avoided if the two intermediate adhesive layers and/or panels are made of materials having different thermal expansion coefficients. In this manner it will be ensured that the image layer will reliably remain tensioned by the intermediate adhesive layer and/or by the panel which has the higher thermal expansion coefficient, even when the laminated panel unit is heated, wherein a slight concave curvature of the entire laminated panel unit will occur with regard to the intermediate adhesive layer and/or to the panel having the higher thermal expansion coefficient.

Tests have shown that for avoiding waviness it is also suitable if the two intermediate adhesive layers have different gluing abilities, since thus the image unit enclosed by the two intermediate adhesive layers will be differently tensioned on either side.

To form an inhomogeneous panel/image layer/panel laminate, whereby a curvature of the entire laminated panel unit will occur instead of the image layer enclosed between the panels becoming wavy, it is also advantageous if the two intermediate adhesive layers and/or panels have different material thicknesses. For instance, an inhomogeneous laminate will also be created if the intermediate adhesive layers on both sides are made of the same material, have the same thermal expansion coefficient, yet the panels differ in material thickness.

It is preferred that at least one intermediate adhesive layer is a sheet, preferably an ethylene vinylacetate copolymer (EVA) sheet, polyvinyl acetate (PVA) sheet, polyvinyl butyral (PVB) sheet or the like. EVA sheets have proved successful in practice since, in contrast to the known polyurethane sheets, they do not require autoclaves for gluing the glass panel to the image layer. As ethylene vinyl acetate copolymer sheets (EVA films), particularly sheets of Sekusui, Bridgestone and Takeda are preferred, the best results in terms of laminate strength having been obtained with the S-LEX-EN film of Sekusui.

If one intermediate adhesive layer is made of a casting resin, a reliable laminate of the image layer with the neighboring glass pane will be given, wherein, of course, the most varying types of casting resins may be used. In tests it has also been proved suitable that one intermediate adhesive layer consists of silicone adhesive.

To prevent moisture from penetrating to the image layer that is enclosed between the panels, in which case the strength of the laminated panel unit would no longer be given and an undesired waviness of the image layer would occur, it is advantageous if on the periphery of the panels, at the narrow sides thereof, an external insulating layer, preferably of silicone, is provided.

If a photograph, a slide, an ink-jet, laser or silkscreen print or the like is provided as the image layer, different laminated panel units in the widest variations can be made, and because of the simple duplication of photographs, ink-jet, laser prints and the like, the production of the laminated panel unit will be particularly cost-efficient. Particularly with a view to a long-lasting light-fastness of the laminated panel unit, when using photographs as image layer, it is advantageous if a photograph developed according to the silver-bleaching method (P3X-method) is provided. Here, preferably so-called “Ilfochromfotos” of the company Ilford which have been produced according to the silver-bleaching method, are used, since from all the known photographic films, they are the most light-fast ones. Such photographs also have the advantage that they have polyester as carrier material, and consequently, together with the two adjacent (glass) panes, they will form an extremely resistant laminate, similar to bullet-proof glass. Likewise, the image layer increases the acoustic insulation of the (glass) panes, which makes them particularly suitable to be used as partition walls.

In order to achieve different optic effects with the laminated panel unit, it is suitable if the image layer is transparent, translucent or opaque. Here, the image layer may comprise the most varying carrier materials, with the carrier material in case of a transparent or translucent image layer, respectively, mostly consisting of triacetate or polyester, whereas in case of opaque image layers, polyester sheets or polyethylene paper is preferably used as the carrier material. The inventive laminated panel unit may thus very well be used as a light regulating means which regulates, or reduces, respectively, incident light.

If the laminated panel unit has an area of larger than 2 $m^2$, preferably larger than 4.5 $m^2$, it may advantageously be used for external applications, such as facades, windows and the like, resulting in an attractive appearance for the viewer from the outside, with the incident light simultaneously rendering the motif of the image layer in the interior space, similar to a slide projection.

The method for producing a laminated panel unit according to any one of claims 1 to 14 is characterized in that the image layer is connected with area contact on either side thereof with the panels by using intermediate adhesive layers, the intermediate adhesive layers and/or the panels having a different thermal expansion behavior. By this production method in which intermediate adhesive layers and/or panels with different thermal expansion behavior are used on either side of the image layer, laminated panel units can be produced in which the image layer cannot become wavy or form blisters, respectively, even in case of temperature changes, so that they may particularly also be used in external applications.

If the panels are glued together without the use of an autoclave, a production of laminated panel units is achieved which is much more energy-saving than known production methods in which the laminated panel unit is glued together by means of a polyurethane sheet in an autoclave.

For a reliable laminate of the image layer with the panels it is advantageous if the laminated panel unit is glued together under a negative pressure. To increase the adhesion propensity of the image layer, it is advantageous if the image layer is cleaned, preferably degreased, on either side prior to gluing.

For a simple and cost-effective production as well as for an easy application of a negative pressure for the gluing it is suitable if the gluing of the image layer with at least one panel is effected in a plastics envelope. In doing so, it is particularly suitable if the plastics envelope, prior to the gluing of the image layer to at least one panel, preferably is evacuated to substantially 0.8 bar, whereby advantageously also the humidity in the plastics envelope is reduced. A high proportion of moisture in the laminated panel unit is particularly detrimental when using “Ilfochromfotos”, since by this the light-fastness of the photographs is negatively affected.

If a casting resin is used as the intermediate adhesive layer, it is advantageous if at first the image layer is merely connected to a first panel, preferably in a plastics envelope, and only in a second method step a second panel is connected thereto after the image layer has been connected to the first panel. Thus, after the first method step, a glue can be applied in frame-like manner to the rim of the panel/image layer-laminate at the image-layer side thereof, whereby the second panel will be kept in spaced relationship from the former under formation of a cavity when being laid onto the image layer, and the cavity can be filled thereafter with casting resin.

When using sheets on both sides as intermediate adhesive layers, it is suitable with a view to an efficient, time-saving production of the laminated panel unit if the image layer is connected simultaneously to both panels.

In the following, the invention will be described in more detail and with reference to preferred exemplary embodiments illustrated in the drawings, to which, however, it shall not be restricted. In detail, in the drawings FIG. 1 shows a view of a laminated glass unit in an exploded, not yet assembled position;

Figure 2:
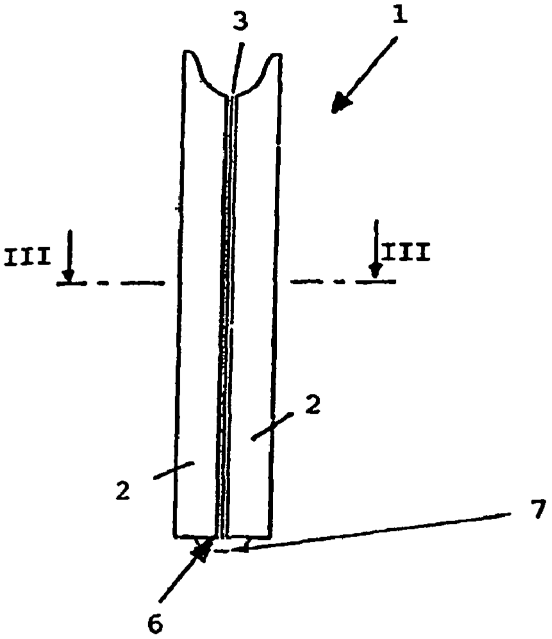
FIG. 2 shows a view of the laminated glass unit in an assembled position.
Figure 3A:
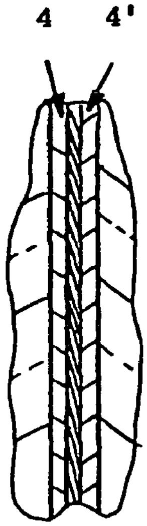
FIG. 3A shows a partial region of the section according to line III-III of FIG. 2.
Figure 3B:
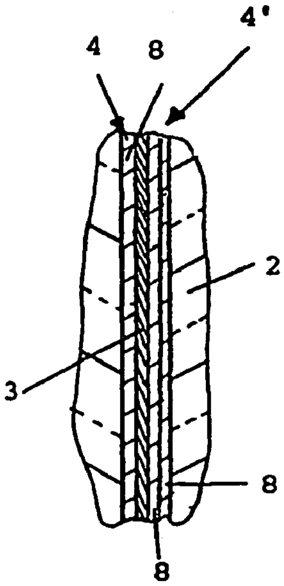
Figure 4:
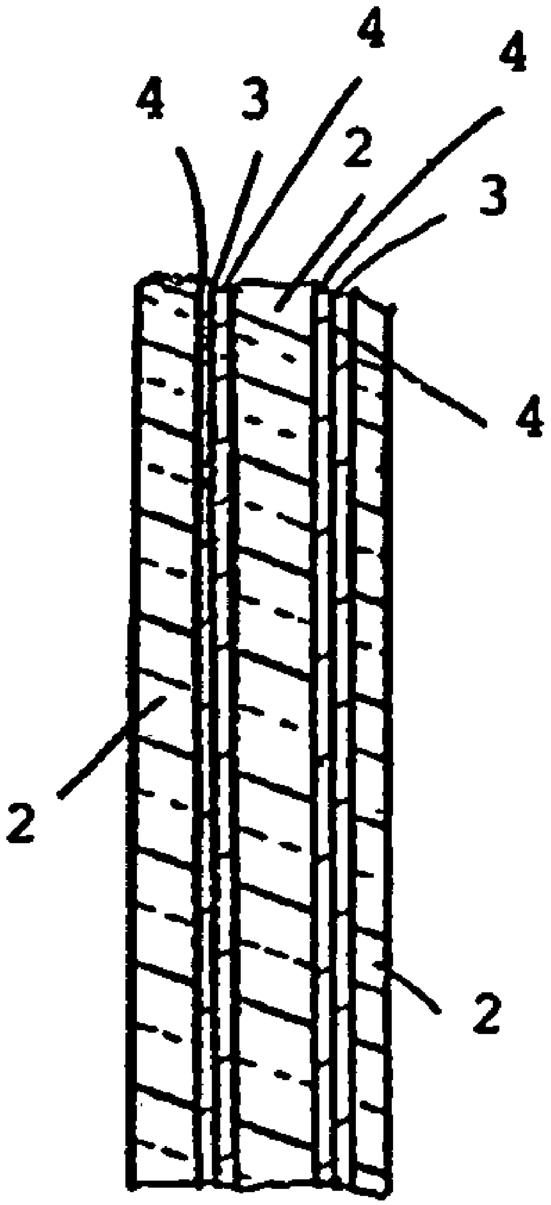

FIG. 3B likewise shows a partial region according to section III-III of FIG. 2, yet with a different intermediate adhesive layer; and FIG. 4 shows a section of a laminated glass unit comprising two image layers.

Figure 1:
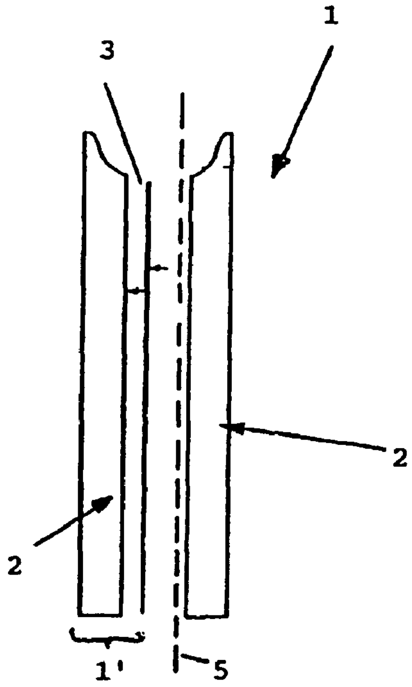

In FIG. 1, a laminated glass unit 1 is shown in a not yet assembled position, wherein the two glass panes 2 are visible between which an image layer 3 is glued by means of intermediate adhesive layers 4, 4' provided on either side of the image layer 3.

Prior to gluing of the image layer 3 which, preferably, is an Ilfochrom-photograph, the former at first is degreased on either side so as to increase the gluing ability.

Then the image layer 3 is applied to the glass pane 2 with an intermediate adhesive layer 4 being interposed. Subsequently, the second glass pane 2 is applied to the glass pane/image layer-laminate 1' with a second intermediate adhesive layer 4' being interposed. The entire, not yet glued together laminated glass unit then is enveloped with a plastics envelope or sheet, respectively (not shown), and closed in an air-tight manner. Subsequently, a vacuum pump is connected to the plastics envelope, and in this manner a negative pressure of approximately 0.83 bar is produced. For gluing the image layer 3 to the intermediate adhesive layers 4, 4', and for gluing the latter to the glass panes 2, the entire glass pane/image layer laminate is “baked” in an oven.

After termination of the gluing procedure and cooling of the laminated glass unit, the plastics envelope is removed.

As an alternative to the simultaneous gluing of a glass pane/image layer/glass pane unit, at first the image layer 3 may also be merely combined with a glass pane 2 into a laminate 1', as sketched in FIG. 1 by the broken partition line 5. After the image layer 3 has been glued to a single glass pane 2, the second glass pane 2 can be put onto the image layer side in spaced relationship by means of a frame-like applied glue, and the enclosed cavity can be filled with a casting resin. Only in a second method step, the second glass pane 2 is then glued to the already glued-together glass pane/image layer laminate 1' with the help of the second casting resin intermediate adhesive layer 4'.

Upon gluing, a laminated glass unit 1 forms, as shown in FIG. 2, with a silicone adhesive 7 being applied on the periphery of the glass panes 2 after the narrow side 6 has been glued, so as to reliably prevent moisture from the outside from penetrating to the image layer 3 enclosed between the glass panes 2; too high a proportion of moisture in the laminated glass unit would reduce the strength of the laminate, on the one hand, and, moreover, deteriorate the light-fastness of the image layer 3, if an Ilfochrom photo is used.

What is essential here is that the two intermediate adhesive layers 4, 4' schematically illustrated in FIGS. 3*a* and 3*b* consist of different materials, since in this manner an inhomogeneous laminate is provided; whereby, when heating the laminated glass unit 1, an unintended wave formation of the image layer 3 between the two glass panes 2 is prevented. For an inhomogeneous glass pane/image layer/glass pane laminate, particularly the different thermal expansion behavior as well as the different gluing abilities of the two intermediate adhesive layers 4, 4' with the image layer is responsible.

For a reliable gluing which, at the same time, does not negatively affect the light-fastness of the laminated glass unit, in particular sheets of ethylene vinylacetate compolymer (EVA), polyvinyl acetate (PVA) as well as polyvinyl butyral (PVB), having a material thickness of approximately 0.25-0.4 mm, are used, since the latter are also suitable for gluing without the use of an autoclave. This in turn results in the advantage of a substantially more energy-efficient production of the laminated glass unit in comparison to the gluing of the layers in an autoclave.

In tests, particularly a sheet of modified EVA has proven suitable which is commercially available under the name S-LEX-EN film from Sekusui. Instead of the plastics sheets, however, also an intermediate adhesive layer of casting resin or silicone adhesive can be provided which has a material thickness of approximately 1 mm.

The afore-mentioned intermediate adhesive layers 4, 4' may be arbitrarily combined with different intermediate adhesive layers 4, 4' to obtain a laminated glass unit 1.

Particularly for an inhomogeneous laminate, it is also suitable to provide the sheets 8 on either side of the image layer 3 in different numbers of layers as said intermediate adhesive layers. For instance, as shown in FIG. 3*b*, merely a single sheet 8 may be applied as intermediate adhesive layer 4 on one side, whereas two sheets 8 are arranged one on top of the other to form the intermediate adhesive layer 4' for connection with a second glass pane 2.

Besides photographs, also ink-jet, or laser prints may be used as the image layer 3, it being possible to use different carrier materials of the image layers 3 in each case. To produce a transparent or translucent laminated glass unit 1, triacetate or polyester is preferred as the carrier material. On the other hand, for producing opaque laminated glass units, paper, polyethylene paper or also polyester films marketed under the trademark Melinex may, e.g., be used as the carrier material for the image layer 3.

When using photographs as image layer 3, preferably copies of positives are used because of their high light-fastness on one of the previously mentioned carrier materials, whereupon the former are developed by means of the silver-bleaching method. In doing so, the film Ilfochrom from Ilford is particularly preferred. On the other hand, however, also copies of negatives may be used on one of the previously mentioned carrier materials, yet their light-fastness is poorer.

To prevent the image layer 3 glued between the glass panes 3 from becoming wavy, it is, however, merely essential that the two intermediate adhesive layers 4, 4' provided for gluing are made of different materials, in particular that they have different thermal expansion coefficients and different gluing abilities, whereby, instead of the image layer 3 becoming wavy, the entire laminated glass unit 1 becomes slightly curved upon heating, wherein, however, this curvature is so unsubstantial that it does not negatively affect the optical characteristic of the laminated glass unit.

In FIG. 4, a section of a laminated glass unit comprising two image layers 3 can be seen. To obtain an inhomogeneous laminate, intermediate adhesive layers 4, 4' each of the same material and with the same material thickness are, indeed, provided in this exemplary embodiment, yet the glass panes 2, being e.g. 2 mm, 4 mm and 6 mm, have different material thicknesses, resulting in a different thermal expansion behavior on each of the two sides of the image layers 3 and, thus, the image layers 3 will reliably remain tensioned even under greatly changing ambient temperatures, as often occurs in case of an external application, e.g. when used as a facade or the like, without undesired waviness or blisters forming.

It goes without saying that the laminated glass unit may also comprise three or more image layers; what is essential is merely that the image layers will remain tensioned even under changing ambient temperatures.

The invention claimed is:

1. A laminated panel unit (1) comprising at least one image layer (3) between at least two panels (2), wherein for an area-contact gluing of the image layer (3) with neighboring panels (2), one intermediate adhesive layer (4, 4') is provided on each side thereof, characterized in that transparent or translucent glass panes are provided as the panels (2), and that the two intermediate adhesive layers (4, 4') following each image layer (3) have a different thermal expansion behavior so that the image layer (3), due to the inhomogeneous laminate, is tensioned between the glass panes in case of temperature changes.

2. A laminated panel unit according to claim 1, characterized in that the two intermediate adhesive layers (4, 4') are made of different materials.

3. A laminated panel unit according to claim 1, characterized in that the two intermediate adhesive layers (4, 4') are made of materials having different thermal expansion coefficients.

4. A laminated panel unit according to claim 1, characterized in that the two intermediate adhesive layers (4, 4') have different gluing abilities.

5. A laminated panel unit according to claim 1, characterized in that the two intermediate adhesive layers (4, 4') have different material thicknesses.

6. A laminated panel unit according to claim 1, characterized in that at least one intermediate adhesive layer (4, 4') is a sheet comprising at least one selected from an ethylene vinylacetate copolymer (EVA) sheet, polyvinyl acetate (PVA) sheet, and polyvinyl butyral (PVB) sheet.

7. A laminated panel unit according to claim 1, characterized in that one intermediate adhesive layer (4, 4') is made of a casting resin.

8. A laminated panel unit according to claim 1, characterized in that one intermediate adhesive layer (4, 4') is made of silicone adhesive.

9. A laminated panel unit according to claim 1, characterized in that on the periphery of the panels (2), at narrow sides (6) thereof, an external insulating layer (7) is provided.

10. A laminated panel unit according to claim 1, characterized in that a photograph, a slide, an ink-jet, laser or silkscreen print is provided as the image layer (3).

11. A laminated panel unit according to claim 10, characterized in that a photograph developed according to the silver-bleaching method is provided.

12. A laminated panel unit according to claim 1, characterized in that the image layer (3) is transparent, translucent or opaque.

13. A laminated panel unit according to claim 1, characterized in that the laminated panel unit has an area larger than 2 $m^2$.

14. A laminated panel unit according to claim 9, characterized in that the external insulating layer (7) is silicone.

15. A laminated panel unit according to claim 13, characterized in that the area is larger than 4.5 $m^2$.

* * * * *